United States Patent Office 3,236,705
Patented Feb. 22, 1966

3,236,705
SOLID POLYMERIC SOLUTIONS CONTAINING METAL SALTS SUCH AS LITHIUM PERCHLORATE
Lucius G. Gilman, Wakefield, and Robert I. Lait, Swampscott, Mass., assignors to Monsanto Research Corporation, St. Louis, Mo., a corporation of Delaware
No Drawing. Filed July 2, 1962, Ser. No. 207,466
17 Claims. (Cl. 149—83)

This invention relates to a new product and method of preparing the same, and more particularly, provides novel products which are solid solutions of a metal salt in a vinyl polymer, wherein said metal salt and said polymer are in the same homogeneous phase, and a method of preparing the same comprising dissolving the metal salt in the vinyl monomer corresponding to the polymer, and thereafter polymerizing to provide said solid solutions.

It has been known previously to incorporate small amounts of metal salts in polymers, by dissolving a catalytic amount of the metal salt in a vinyl monomer and effecting polymerization. In this case, because as a general rule increasing the amount of catalyst decreases the molecular weight of the polymer, the amount of metal salt so introduced has been minimized, and the properties of the polymeric product are as nearly as possible the same as those of the polymer which would be produced in the absence of the metal salt.

It has also been known to produce filled polymers: that is, polymeric products in which the polymer constitutes a binder which is separate and distinct from that of the solids phase of the filler incorporated therein, so that the products are heterogeneous compositions. In general, a filler will stiffen the polymer with which it is combined, to result in a more rigid product than the polymer alone, and the filler will opacify the product, so that while a sheet of the polymer itself will be transparent or translucent, a sheet of the filled polymer is opaque. Since the particulate solids phase has no inherent cohesiveness, the amount of filler solids which can be included in a given amount of polymer is limited by the binding power of the polymer.

It is an object of this invention to provide novel products comprising polymer and a metal salt.

A particular object of this invention is to provide novel products comprising a polymer and substantial amounts of a metal salt in the same homogeneous phase.

Another object is to provide a novel method of incorporating substantial amounts of a metal salt in the same homogeneous phase as a polymeric binder.

These and other objects will become evident on a consideration of the following specification and claims.

It has now been found that polymerization of a vinyl monomer, said monomer including a donor atom selected from the group consisting of N, O, and S, in the presence of dissolved metal salt, forms a polymeric product incorporating the salt. The stated product is a novel material, which is a polymeric solid solution of the polymer and the metal salt in the same homogeneous phase.

This polymeric solid solution product, it is to be appreciated, is not a salt "of" the polymer, but a novel combination of a salt "and" a polymer. The sodium or other cation ionically bonded to the anionic carboxylate group of a polymer like polyvinyl acetate resin is an example of a salt of a polymer. Here an anion supplied by the polymer satisfies a valence of the metallic cation, replacing some other anion originally present in the salt or other derivative of the metal from which the polymeric salt was prepared. In the present products, the metal salt retains all its original anions.

There is, however, evidence that the metal salt and polymer in these novel products do not merely exist as separate species in the same phase, but rather are combined by some sort of coordination to form a new, unique species. The products have properties unlike those of the polymer itself. The presence of the metal salt seems to affect the positioning of the polymer chains, with results affecting whether the structure is amorphous or crystalline.

It is found that incorporation of a metal salt in a polymeric structure in accordance with this invention generally exerts, not a stiffening, but a plasticizing effect. The resulting polymeric products are more flexible and rubbery than the polymeric binder by itself. Moreover, measurements of the electrical conductivity of the products, especially of the polymeric products including an organic plasticizer in addition to the metal salt plasticizer, show that they have significant electrical conductivity. Polymeric products with conducting properties have been known heretofore, which were prepared by loading up a polymer with a conductive material such as a conductive carbon black. These, however, are opaque products. On the other hand, the polymeric products of this invention are generally transparent, clear materials. Their optical clarity is such, indeed, that they can be used to prepare window panes and like coverings through which optical observations can be made. It is known that the composition of optically transparent barrier panes can affect the nature of the light transmitted thereby, and by varying the metal solvate included, thus, filters and like selective transmitters of radiation can be prepared.

The present products can be formed by methods usual in the plastics art, such as casting or extruding, to provide shaped structures which may be used, if desired, in applications similar to those known for vinyl plastics or used to take advantage of some of the unique properties of these products. The dissolved salt generally increases the density of the product quite substantially, compared to the polymer alone, and indeed, more so than a simple additive effect would account for. For example, combined with heavy filler, they provide an exceptionally dense polymeric material. After shaping into films, the present products can be leached with water to remove the salt content, leaving a film with a high water transmission rate. Where the black color produced by loading a polymer with conductive carbon black is objectionable, the present products can be used instead to provide an electrically conductive plastic, and so forth.

The products of this invention may be described as polymeric solid solutions of a metal salt and polymeric binder consisting essentially of a polymer of a vinyl monomer containing a donor atom selected from N, O, and S, in the same homogeneous phase.

By solid solution is meant that the metal salt and the polymer are homogeneously mixed and in the same phase, to the extent that heterogeneity therebetween is not evident on examination under an ocular microscope.

The present products are here designated as solid solutions with reference to the fact that a solvation effect seems to be involved. For one thing, it is found that only metal salt in solution in the vinyl monomer system goes into solution in the polymer. For example, if the vinyl monomer is polymerized in the presence of solids comprising the salt, the solids are present as a separate phase when the polymer has been formed, while when the conditions are such that all the salt is put in the liquid phase, as for example by raising the temperature, then the product is similarly an entirely homogeneous material, as transparent and clear as the polymer itself would be.

By a polymeric binder is meant a matrix comprising polymer having a molecular weight at least sufficient to make the polymer solid at room temperature. It is undesirable to have the molecular weight so high that the polymer is infusible and insoluble. Preferably, the product will be sufficiently elastomeric to have a strength of at least 50 pounds per square inch (p.s.i.) and ultimate elongation (at break) of at least 20%.

The essential polymer component of the present products is a polymer of an olefin, by which is meant that it is derived from addition polymerization of an olefinic monomer. It is found that the useful olefinic monomers are characterized by the inclusion of a group containing a donor atom. The donor atoms of the olefins may be selected from O, S, and N and combinations of such donor atoms.

Donor atoms are atoms having a free electron pair, and it is thought that solvent power for the metal salt has some connection with ability to coordinate with the metal cation. In any case, hydrocarbon polymers do not appear to dissolve metal salts to any significant extent.

Broadly, the useful monomers may be defined as olefins wherein an unsaturated aliphatic hydrocarbon radical is substituted by at least one group including a donor atom. Such olefinic monomers are represented by the formula

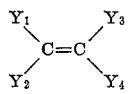

where each of $Y_1$, $Y_2$, $Y_3$ and $Y_4$ is selected from the class consisting of H, hydrocarbon radicals and a group including at least one donor atom of the class consisting of O, S, and N, provided that at least one of $Y_1$, $Y_2$, $Y_3$ and $Y_4$ is a group including a donor atom. Thus the structure characterizing the polymers in the products of this invention is that of a chain of repeating hydrocarbon units, produced by addition polymerization of the olefinic bond, substituted by donor-atom-containing groups.

Specifically, the useful monomers for present purpose will generally be vinyl monomers, of the formula

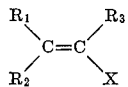

where each of $R_1$, $R_2$ and $R_3$ is selected from H and hydrocarbon radicals and X is a group including a donor atom selected from O, S and N. Preferably, each R is H, or two of $R_1$, $R_2$ and $R_3$ are H, and the other R is lower alkyl.

The group including a donor atom in the polymers of the present invention which is particularly advantageous is the carbonamide group, the preferred polymers which include a carbonamide bond being those prepared from an olefin in which the sole non-hydrocarbon configuration is a side-chain carbonamide group, thus producing a hydrocarbon polymer chain with repeating carbonamide side groups. For example, they may be polymers of acrylamide, of C-alkylated acrylamides such as methacrylamide, or of N-alkylated and C- and N-alkylated acrylamides such as N-methacrylamide, N-tert-butylacrylamide, N-tert-octylacrylamide, N,N-dimethylacrylamide, N,N-dipropylacrylamide, N-octylmethacrylamide, N-decylmethacrylamide and the like. Non-acrylic olefins such as 3-butenoic amide are also useful. Presently useful polymers also may be polymers of cyclic amides including polymerizable olefinic unsaturation, the polymers of which are formed by addition polymerization, such as 1-vinyl-2-pyrrolidinone, 3-methyl-1-vinyl-2-pyrrolidinone, and the like.

Still another group of polymers which may form the polymeric component of the present novel products are those made by addition polymerization of an olefinic amide having in a side chain a further substituent including a hetero atom (polyvalent atom other than C) selected from the group consisting of O, S and N. References herein to "an" acrylamide are intended to include both those in which the only non-hydrocarbon component is the carbonamide side chain group and those including hetero atoms of the type just stated. Illustrative of such amides are, for example, oxy compounds including hydroxy amides such as N-methylolacrylamide, N-(2-hydroxyethyl)-acrylamide, 2-methylolacrylamide and the like and ether amides such as N-acrylylmorpholine, N-methacrylylmorpholine and N-(2-ethoxyethyl)acrylamide and so forth. The S-containing amides may be illustrated by N-(mercaptomethyl)acrylamide, 2-(2-ethylthioethyl) acrylamide and N-(tetrahydrothienyl)acrylamide. Illustrative of the N-containing amides are acrylic hydrazide, N-acrylylpiperazine, 2-(aminomethyl)acrylamide, 1-cyanoacrylamide, N-(trinitroethyl)acrylamide and the like.

Referring to the polymers in products of this invention which are free of carbonamide bonds, derived from olefinic monomers susceptible to addition polymerization, those containing O are illustrated first by ethers. Thus, they may be polymers of olefinic ethers such as 1-methoxybutadiene. Another class of O-containing polymers included herein are polymers containing OH groups such as polymers of allyl alcohol. The polymer may be derived from an olefin containing both O and OH such as vinyloxyethanol.

Another group containing O which may characterize the polymers is oxo, rather than the oxy groups shown above. For example, this may be keto, as in methyl vinyl ketone.

Even more desirably, it will be a carboxylate group such as ester groups. Useful esters include as a first class the polymers of olefinic esters. Either the alcohol or the acid portion may be the olefinic group. Illustrative esters include those in which the acid portion of the molecule is unsaturated such as acrylates like methyl acrylate, tert-butyl acrylate, hexyl acrylate, and decyl acrylate, methacrylates such as methyl methacrylate, ethyl methacrylate, n-butyl methacrylate and the like. Illustrative of some esters in which the alcohol-derived portion of the molecule is unsaturated are allyl esters such as allyl acetate, and vinyl esters such as vinyl formate, vinyl acetate and vinyl stearate.

Alternately, the polymer may contain carboxylic radicals as derived from olefinic anhydrides, such as maleic anhydride.

S-containing polymers are illustrated by the polymers of olefins such as vinyl methyl sulfide. N-containing polymers are illustrated by polymers of vinylpyridine, acrylonitrile and the like.

There is no objection to combining several characterizing groups in a single molecule providing the repeating unit in a polymer as contemplated hereby, and indeed, this may be particularly advantageous. For example, polymers of esters of O-containing alcohols may provide both oxy and oxo oxygen, such as 2-methoxyethyl acrylate, 2-methoxyethyl methacrylate, ethylene glycol dimethacrylate, the acrylate ester of a polyethylene glycol such as diethylene glycol and so forth. Or the alcohol may contain amino N such as N,N-dimethylaminoethyl methacrylate and the like.

Mixtures of monomeric compounds such as those above mentioned may have solvent power for lithium perchlorate which is substantially greater than either of the compounds alone. Thus useful mixtures of such vinyl monomers include for example acrylamide-maleic anhydride, acrylamide-2-methoxyethyl acrylate, acrylamide-vinyloxyethanol, acrylamide-acrylonitrile, acrylamide-allyl acetate, acrylamide-vinyl formate, and so forth. Generally, mixtures in the ratio of about 1:1 mole are found advantageous, but other proportions of the vinylic monomers may be employed if desired. It is to be understood that a copolymer is to be regarded as a polymer of a particular monomer if it contains enough of the monomer to confer characteristics of the homopolymer on the copolymer: for example, references to a polyacrylamide herein are intend to include copolymers in which at least 30 mole-percent of polymerized olefinic monomer is acrylamide.

Especially where the selected monomer is an N-alkylated acrylamide, which does not cross-link in polymerization as does acrylamide, it is sometimes advantageous to include a small proportion of a cross-linking monomer such as acrylamide or methylene diacrylamide in the mix. Proportions such as from 0.01 to 0.10 mole of the cross-linking monomer to 1.0 mole of the non-cross-linking monomer are useful in this connection, to improve toughness and the like.

The metal salts which can be used to practice the invention include any of a very wide variety of materials. The cation must be metallic. Of the elements in the Periodic Table, this excludes the halogens, the inert gases, and the non-metals of Groups IV–VI, periods 2 and 3 (C, Si, N, P, O and S). Practically any other cation appears to be effective. For example, as shown by examples hereinafter, these include light and heavy Group I metals like Li and Ag, Group II metals like Zn and Mg, a Group IV metal like Pb, and so forth. The invention can also be applied to salts of beryllium in Period 2 of the Periodic Table, sodium and aluminuum in Period 3, and the salt-forming metallic members of all the higher Periods of the Table including the rare earth groups and the transition metal groups, as exemplified by Co and Ni, Pd and Pt, Sn and Sb, As and Se, Ce and Cm, W and Y, and so forth.

The mechanism by which a metal salt is held in solution in the polymer in the products of this invention is that of coordination. As is well known in the chemistry of coordination compounds, the ability of a given functional group to solvate a metal and coordinate with it depends on the nature of the functional group and also on the nature of the metal salt. Where the salt is one in which the metal ion is stripped, and free of coordinated groups occupying its coordination spheres (such as water of hydration), the metal salt is more available to be solvated by a solvent comprising a given functional group than when the functional group of the solvating molecule must displace other groups from the coordinating sphere or spheres of the metal ion. In general, bulky anions such as complex oxy-anions like the perchlorates or tetrafluoborates are more likely to form salts in which, at least after dehydration, the coordinating spheres of the metal are unoccupied than are the smaller anions.

Thus, useful anion salts may include, for example, perchlorates, fluoroborates, borates, bromates, carbonates, chlorates, oxychlorides, chromates, fluophosphates ($PF_6$), fluorates, molydates, phosphates, and the like.

Presently useful metal salts are not limited to those with complex anions as listed above. For example, lead acetate may be used to prepare novel products of the above description. Similar salts of organic acids which may be used in the present products are illustrated by silver formate, lithium acetate, copper propionates, beryllium acetate, tin hexanoate, tin sebacate, chromium acetate, tungsten cyclohexonate, lead benzoate and the like.

Again, simple halides of metals are found to be effective solutes in the practice of this invention. Illustrative of these are zinc chloride, lithium chloride, strontium iodide, antimony bromide, aluminum chloride, beryllium fluoride, manganese chloride, sodium chloride and the like.

As will appear hereinafter, it is often essential for the effective solution of a metal salt in accordance with this invention that the salt be in the anhydrous state. Water coordinated to the coordinating spheres of the metal salt may prevent its solvation by vinyl monomer or polymer.

However, in some cases the coordinating ability of a given donor-atom-containing functional group is so high that it displaces other coordinated groups from the coordinating spheres of the metal ion. Thus for example, the hydrate of lead acetate may be employed in conjunction with acrylamide in practicing the method of this invention; and it is found that the water of hydration is actually displaced from the lead salt as it goes into solution in the acrylamide, even before the monomer is polymerized, so strong is the affinity of the amide functional group for the lead ion. Thus the nature of the functional group must be considered in conjunction with the nature of the metal salt in determining whether any given pair of a polymer comprising a functional group including a donor atom selected from O, S and N, and a given metal salt is appropriate for formation of the novel polymeric products of this invention.

If the selected materials are to have sufficient solvating power for the metal salt to bring enough metal salt into solution in the polymeric product to alter its properties appreciably, the analogous low molecular weight material must have an appreciable solvating power for the metal salt. By an appreciable solvating power is meant that at least enough of the metal salt is dissolved at a temperature below 100° C. to supply at least 1 metal ion for every 12 functional groups in the solution. For most metals, the coordinating number will be either 4 or 6, and enough metal may be dissolved in the product of this invention to supply, correspondingly, 1 metal ion for each 4 or 6 functional groups present in the product. But a significant change in the properties of the polymer is achieved when the amount of dissolved metal salt is down to about ½ this, such as 1 ion of metal salt for every 8 or 12 functional groups, or one mole per 12 moles of vinylmonomer.

It has been observed in practicing the present invention that when the vinyl monomer dissolves all of the metal salt at elevated temperatures chosen for the polymerization, such as temperatures between 50 and 100° C., for example, 85° C., the polymeric product formed by polymerization of the monomer in the presence of the dissolved metal salt retains the metal salt in solution, even after cooling to room temperature, at which temperature the vinyl monomer itself would not retain all of the metal salts in solution which it held in solution at 85° C. Indeed, it is sometimes observed that whereas undissolved metal salt is present in the mixture of metal salts and vinyl monomer, the metal salt goes into solution as the polymerization proceeds, and all the metal salt is dissolved in the resulting polymeric product. Thus the solvation powers of the polymer appear to be greater than those of the corresponding monomer.

In forming the polymer, the double bond is of course destroyed in the course of polymerization of the vinyl monomer, and in the polymer the backbone chain consists of a saturated hydrocarbon chain with functional substituents present thereon at regular intervals. This being the case, it is found that an appropriate measure of the adaptability of a given metal salt for formation of a solid solution in the polymer, in the same homogeneous phase as the polymer, is the saturated analog of the vinyl monomer from which the polymer will be prepared. The solvating power of the saturated analog of the vinyl monomer will be a measure of the solvating power of the functional groups of the polymer chain, by which the metal salt is held in solution in the polymer to provide the single homogeneous phase comprising polymer and metal salt as provided by this invention.

By reference to the saturated analog of a vinyl monomer is meant a compound with the same functional groups and configuration as the vinyl, but in which a saturated aliphatic hydrocarbon group of about the same number of carbon atoms as the vinyl group replaces the unsaturated portion of the vinyl monomer. Thus for example, the solvating power of propionitrile for a given salt is a measure of whether said metal salt can be combined with acrylonitrile in polymeric products of this invention based on polyacrylonitrile. The solubility in propionamide is a measure of the metal salt's adaptability for preparation of such polymeric products based on polyacrylamide. The solvating power of ethyl propionate is a measure of the metal salt's suitability for preparation of polyacrylate ester compositions, and so forth.

An important factor in connection with the present invention is the anhydrous state of the metal salts in preparing the present products. Metal salts are not normally supplied, even for laboratory use, as anhydrous materials, and their dehydration is not usually a simple matter of heating the salt in an oven. The difficulties of accomplishing their dehydration may be appreciated from the fact that chlorides are considered relatively easy to dehydrate, because all this requires is sweeping the salt for a day or so with dry gaseous HCl to drive out the water. Thus the salts which have been associated with polymer or polymerization systems would have been used in the hydrated state, in the absence of any reason to appreciate the criticality of the absence of hydration.

This is not to say, however, that the present invention cannot successfully be practiced with initially hydrated salts. In the course of study of the phenomenon of polymeric solid solutions, as further set out hereinbelow, it has been found that systems exist wherein the water of hydration is driven off from a metal salt during the polymerization. It boils out as steam, leaving the anhydrous metal salt in solution in the polymer. But if the resulting solid solution is now exposed to water vapor, the salt in the solid solution becomes hydrated. As it does, the salt comes out of solution, thus illustrating the necessity for the metal salt to be in the anhydrous state if the polymeric solid solutions are to exist.

The present compositions may consist essentially or entirely of the polymer and metal salt. As will appear hereinafter, however, it is often desirable to include other components in the composition, such as plasticizers, fillers, and so forth. These may either be part of the same binder phase as the polymer, or part of the discontinuous solids phase combined with the binder. A surprisingly great improvement in solubility of a metal salt may be obtained, it has been found, by including a solvent-plasticizer, as for example, by including a glycol in the polymerizing system of a metal salt like lithium perchlorate and a vinyl monomer like acrylamide.

To make the presently provided novel products in accordance with the method of this invention, an olefinic monomer of the nature discussed above will be polymerized in the presence of the dissolved metal salt.

Polymerization of the monomer can be initiated thermally or catalytically. The metal salts in solution in the monomeric system may catalyze the polymerization. For example, lithium perchlorate is in itself an effective initiator of polymerization at 85° C. with vinyl monomers that normally undergo cationic polymerization, such as vinyl ethers, α-methylacrylamide, acrylamide, and vinyl formate. Copending application S.N. 28,818, filed May 13, 1960, by Russell B. Hodgdon, Jr., assigned to the same assignee as the present application, relates to the use of lithium perchlorate as catalyst for polymerization of such monomers. It is to be appreciated, however, that mere catalytic amounts, such as 2–5% by weight of the total reaction mixture will not be sufficient to provide an amount of dissolved lithium perchlorate in the product sufficient to make the product have properties significantly different from those of the polymeric binder alone. In accordance with this invention at least about 0.1 part by weight and preferably at least about 1.0 part by weight of lithium perchlorate, per part of the olefin monomer, will thus be dissolved in the monomer containing reaction mixture in the preparation of the present products.

To provide a significant alteration in the properties of the product from those of the polymeric binder alone, dissolved lithium perchlorate will be present in the polymeric binder in an amount at least equal to about 10 weight-percent of the weight of the vinyl polymer in the binder. Preferably, at least about one part by weight of lithium perchlorate per part of vinyl polymer will be combined therewith, dissolved in the polymeric binder. Higher ratios, in which the amount of dissolved lithium perchlorate is equal to or exceeds the weight of vinyl polymer, are especially desirable for many applications and can be attained in accordance with this invention. Indeed, the dissolved perchlorate can constitute 92% or more of the weight of the total composition.

Solution of the metal salt in the monomer-containing polymerization mixture should usually be effected before polymerization has been initiated or at least before it is substantially advanced. To effect this, it may be necessary to stir and heat the system comprising the olefinic monomer to put the desired amounts of the salt into solution, though once in solution, the salt generally stays in solution in the liquid even on discontinuance of the heating. If the vinyl monomer being used is one for which the salt is a polymerization catalyst, solution and polymerization may proceed concurrently.

In systems comprising concentrations of metal salt as contemplated hereby, it may not be desirable to employ the salt as sole catalyst. An induction period of five to twenty minutes before polymerization starts is observed to occur with anhydrous lithium perchlorate using low catalytic concentrations of the perchlorate, giving time to pour and shape the mass, but the induction period of the reaction is reduced drastically when a 1:1 molar ratio of lithium perchlorate to acrylamide is exceeded.

Various other components of the solution comprising the vinyl monomer and the lithium perchlorate can also affect its polymerization. For example, addition of a hydrazine salt to a solution of lithium perchlorate in acrylamide stops the reaction immediately and a low molecular weight polymer is obtained even when such powerful cationic catalysts are added as boron trifluoride etherate. However, free radical polymerization occurs readily. Thus cumene hydroperoxide will cause the complete polymerization of acrylamide rapidly in the presence of an inhibitor. Other free radical initiators such as benzoyl peroxide also cause polymerization in the presence of inhibitors of cationic polymerization.

Another useful approach to effecting the polymerization, where a monomer polymerized by lithium perchlorate is employed to practice the method, is to include a polymerization inhibitor such as an amine in the reaction mixture, and after accomplishing solution of the lithium perchlorate in the monomer-containing mixture and thorough mixture of the components, quickly mix in a reagent which neutralizes the inhibitor, cast (or extrude) and allow polymerization to a solid to occur.

The essential components of the polymerization mixture are the dissolved metal salt, the olefinic monomer containing a side-chain group including a donor atom selected from O, S and N, and also catalyst where the salt is not itself the catalyst. As will become evident hereinafter, the mix may also contain other components, and conditions for polymerization may be varied depending on what these are. In general, polymerization may be effected at temperatures ranging from 0° C. and below up to any temperature below decomposition temperatures of reaction mixture components. Where heating does not have to be avoided because of the presence of sensitive ingredients, it is usually desirable to heat the reaction mixture to promote fluidity of the mix and solubility of the perchlorate. An advantage of the present method is that it is usually possible to effect polymerization at conveniently rapid rates while staying at relatively low temperatures such as between 50° C. and 100° C.

Usually polymerization is effected simply by maintaining the monomer in contact with active catalyst at suitable temperatures. If desired, variation of pressure from atmospheric—for example, down to 0.1 mm. Hg, or up to 5000 p.s.i.—may be employed. Solvents and diluents, such as plasticizers and the like, discussed, in more detail below, may be present.

After polymerization is complete, it is sometimes advantageous to maintain the polymerized mass at temperatures above ambient temperature for a time, to effect cure or post-cure of the mass.

As the foregoing has indicated, compositions provided in accordance with this invention may consist essentially of a polymer of the kind stated above, and a metal salt in solid solution therein. Desirably, however, additional components will be present in compositions embodying the present invention. Components which are particularly desirably present in such compositions comprise polymer-modifying additives such as plasticizers, and in this connection it has been found that unexpectedly large increases in solvent power for the metal salt can be achieved by selection of appropriate plasticizers.

Additives which can advantageously be incorporated in the compositions of this invention comprising homogeneous mixtures of polymer and lithium perchlorate are the relatively low molecular weight plasticizers. One exemplary class of these are amides. These include, for example, the sulfonamides such as N-monosubstituted toluene sulfonamides such as N-ethyl-p-toluenesulfonamide, N-ethyl-o-toluenesulfonamide, and mixtures thereof. Further it includes amides and hydrazides such as formamide, dimethylformamide, hydrazodicarbonamide and oxaldihydrazide.

Another group of useful plasticizers are glycols and glycol ethers such as triethylene glycol dimethyl ether, ethylene glycol, glycerol and the like. In this group, ethylene glycol is found to exert a particularly favorable effect, used both alone and in combination with other plasticizers in the binder compositions.

The plasticizers preferably should be fairly polar and also be solvents for the metal salt such that components of the system are mutually soluble or dispersible to effect a homogeneous solid composition. The presence of the plasticizers may render the composition more rubbery and provide a material improvement in tensile elongation of the material.

The amount of plasticizer employed can vary up to about 200 weight percent of the polymer present in the composition but amounts of from about 50 to about 100 weight percent are generally preferred.

Also, the novel homogeneous, single-phase combinations of metal salt with polymers provided by this invention can advantageously be combined with particulate fillers to provide heterogeneous, multiple phase compositions. Thus the compositions may contain finely divided conventional polymer fillers such as talc, mica, carbon black, wood flour, and the like. For example, the homogeneous mixture of metal salt and the polymer may be combined with up to about 90% by weight of the total composition of filler material. It is often desirable to incorporate not more than from 5 to about 10 weight percent of said additives based on the total weight of the composition.

The invention is illustrated but not limited by the following examples, in which all parts are parts by weight unless otherwise noted.

*Example 1*

This example illustrates polymerization of acrylamide in the presence of dissolved lithium perchlorate.

A mixture is prepared of 10 parts of acrylamide and 28 parts of lithium perchlorate. Addition of small amounts of benzoyl peroxide produces rapid polymerization at 105–130° C. The solution of the perchlorate appears to occur contemporaneously with polymerization of the monomer. The solid polymeric product is a rubber-like material.

*Example 2*

Examination of the monomeric acrylamide/lithium perchlorate system provides the following information.

The phase diagram of the two-component system, lithium perchlorate and acrylamide, shows the existence of a stable 1:1 molar ratio addition compound as well as the much less stable 2:1 and 3:1 compounds. The latter compounds freeze to glassy solids at approximately −53° C. and −37° C., respectively. The shape of the liquidus curve indicates the extreme instability of these two compounds with a high degree of dissociation at their melting points. In contrast, the 1:1 molar compound is a white, crystalline solid with a sharp melting point of 97° C.

Mixtures of anhydrous, pure lithium perchlorate and acrylamide in which the perchlorate constitutes from about 25 to about 45 weight percent of the total are completely fluid at 0° C. The melting point of acrylamide is 85° C., and the melting point of anhydrous lithium perchlorate is 236° C.

*Example 3*

Examination of the catalysis of the polymerization of acrylamide and other vinyl monomers by lithium perchlorate provides the following information.

Lithium perchlorate is an effective initiator of polymerization at 85° C. with vinyl monomers that normally undergo cationic polymerization. It causes the polymerization of the following monomers in decreasing order of effectiveness: vinyl ethers, α-methylstyrene, α-methylacrylamide, acrylamide, and vinyl formate. Further observations demonstrate clearly that cationic polymerization is involved: (1) anhydrous lithium perchlorate polymerizes only styrene out of a styrene/methyl methacrylate mixture, (2) lithium perchlorate which has been coordinated with water fails to initiate any polymerization, (3) strong amines prevent initiation by lithium perchlorate, (4) weak amines retard polymerization in the presence of lithium perchlorate, (5) neither lithium ion by itself nor perchlorate ion by itself is an effective initiator, and (6) lithium perchlorate in ammonium acetate buffer produces polymerization, proving that perchloric acid is not the initiating agent.

A study of the kinetics of the lithium perchlorate-catalyzed acrylamide polymerization in methyl ethyl ketone solution at 57.5° C. has shown that the reaction is first order with respect to monomer and is also dependent on the lithium perchlorate concentration to some unknown power. Surprisingly, the induction period of the reaction and the rate of polymerization are reduced drastically when a 1:1 molar ratio of lithium perchlorate to acrylamide is exceeded, suggesting a change in mechanism of polymerization at this point.

The cationic lithium perchlorate catalyzed acrylamide polymerization probably involves water as a co-catalyst. This assumption is supported by the fact that most of the samples prepared for the study of the acrylamide-lithium perchlorate concentrations using carefully dried materials, remained at room temperature for three to seven days before polymerization was initiated. In fact, temperatures up to 85° C. could be maintained for several hours before gelling occurred. The presence of small amounts of water may increase the concentration of the catalytically active species I.

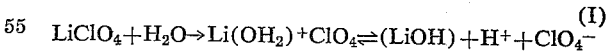

$$LiClO_4 + H_2O \rightarrow Li(OH_2) + ClO_4 \rightleftharpoons (LiOH) + H^+ + ClO_4^- \quad (I)$$

It is well known that other cationic catalysts, such as boron trifluoride or aluminum trichloride, require small amounts of water for effective catalysis.

This explanation is consistent with the observation that the induction period and rate of polymerization are drastically altered when a 1:1 molar ratio of lithium perchlorate to acrylamide is exceeded. Although lithium perchlorate has four coordination sites available, steric repulsion as well as the inherent stability of the 1:1 complex as shown by the phase diagram renders very difficult the replacement of acrylamide or addition of water to the complex. Unless excess lithium perchlorate is made available for coordination with water, there is very little of the species I and the rate of polymerization is slow.

The polyacrylamide contained in the crude monomer probably has active end groups that can initiate free radical polymerization, and in fact this type of polymerization is enhanced by lithium perchlorate. N-nitrosodiphenylamine, a free radical inhibitor, also retards the cationic lithium perchlorate catalyzed polymerization because of its basic nature.

Example 4

Examination of the polyacrylamide solid solutions of lithium perchlorate provides the following data.

A completely homogeneous, fluid system is obtained by combining 1.5 parts of lithium perchlorate with one part of acrylamide at 85° C. The lithium perchlorate catalyzes the polymerization of the acrylamide. On cooling to room temperature, a solid polymeric material is obtained which is optically clear and has a rubber-like flexibility and resilience.

Polyacrylamide is normally an amorphous polymer. However, X-ray diffraction patterns of solid solutions of lithium perchlorate in polyacrylamide show the presence of a unique crystalline species as well as an amorphous phase, particularly when the lithium perchlorate concentration exceeds 50 percent by weight. These crystallites, whose sizes all exceed 0.1 micron, are not lithium perchlorate or its trihydrate, but are formed from a crystalline addition compound of lithium perchlorate and the pendant amide groups of the polyacrylamide.

The postulate of amide group/lithium perchlorate addition compounds is supported by the results of studies of phase diagrams of lithium perchlorate and both acetamide and dimethylacetamide, which show the existence of addition compounds with molar ratios of 2:1 and 1:1 amide/lithium perchlorate, respectively. In addition, the infrared spectrum of a tetrahydrofuran solution of lithium perchlorate and propionamide shows a weak association between the lithium ion and the carbonyl oxygen atom. The shift of the carbon-oxygen and carbon nitrogen stretching frequently is consistent with the following structure for the coordination compound.

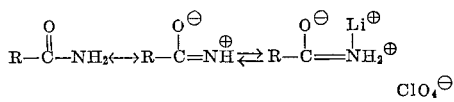

Finally, the X-ray diffraction pattern of a solid, fused mixture of propionamide and lithium perchlorate demonstrates the formation of a unique crystalline species. Apparently, the amide group and lithium perchlorate interact strongly enough to produce a crystalline compound without the orienting influence provided by the polymer chains.

Close examination of the X-ray diffraction patterns of solid solutions of lithium perchlorate in polyacrylamide as the amount of inorganic salt is varied from 50 to 65 percent shows that the crystalline species varies only slightly even though the compositions are quite different. The slight variations observed could be due to some slight excess of one of the main components held interstitially in the main crystal lattice. Similar variations are observed when small amounts of ethylene glycol are added to the solid solutions.

In contrast, solid solutions that contain less than 50 percent by weight lithium perchlorate exhibit only a slight crystallinity.

Example 5

Addition of ethylene glycol to the lithium perchlorate/acrylamide system is found to extend the liquid region.

The ethylene glycol acts as a solvent for the 1:1 molar complex and any other constituent material but does not appear to undergo any other significant interaction with the rest of the system. For example, at 60° C., up to 170% by weight lithium perchlorate will dissolve in a mixture of equal parts by weight of acrylamide and ethylene glycol. The significant solubility data are shown below.

| Lithium perchlorate, weight percent | Temperature of phase change, ° C. |
|---|---|
| 0 | 36 |
| 10 | 16 |
| 17 | −16 |
| 20 | −80 |
| 24.8 | −78 |
| 27.4 | −76 |
| 29.5 | −78 |
| 45 | −72 |
| 50 | −23 |
| 56 | 24 |
| 60 | 49 |
| 62.5 | 65 |
| 70 | 115 |

Example 6

Examination of catalysis of the polymerization of the lithium perchlorate/acrylamide/ethylene glycol system provides the following data. The polymerization of acrylamide in ethylene glycol may be thermally activated by heating at 90° C. or higher. However, when lithium perchlorate is present, particularly in large amounts, polymerization proceeds under much milder conditions. In fact, complete polymerization in a matter of minutes has been observed at room temperature. Other cationic catalysts such as boron trifluoride etherate and aqueous perchloric acid show the same effect.

Cationic polymerization of acrylamide does not proceed satisfactorily in the presence of hydrazine or its mono or diacid salts. A low molecular weight polymer is obtained even in the presence of powerful cationic catalysts such as boron trifluoride etherate and 60% perchloric acid. The hydrazine salts probably complex the propagating species and prevent polymerization to a high molecular weight polymer. Addition of a hydrazine salt to a lithium perchlorate-catalyzed acrylamide polymerization also stops the reaction immediately.

However, under these conditions, polymerization may be successfully accomplished by the addition of free radical initiators such as cumene hydroperoxide or benzoyl peroxide.

Apparently, cationic and free radical mechanisms are capable of acting, if not simultaneously, then at least complementary to each other. If one does not work, the other may. Indeed, if both types of initiators are used, polymerization proceeds more rapidly than if either was used separately.

Water is a co-catalyst for the lithium percholrate-catalyzed polymerization of the acrylamide, but the system can tolerate only minor amounts of this co-catalyst, such that the system is essentially anhydrous.

An induction period before polymerization of from 5–20 minutes is observed using anhydrous lithium perchlorate. If the anhydrous salt is exposed to atmospheric moisture for 10 minutes, the induction period increases markedly. Exposure of the lithium perchlorate to moisture for over one hour totally inhibits the polymerization.

Varying the lithium perchlorate concentration while maintaining a constant water concentration does not appear to affect the rate of polymerization in a significant manner, but it does have a significant effect on the apparent degree of polymerization of the polymer. This effect is illustrated by the following data:

| Mole ratio, LP/AA | 0.77 | 0.90 | 1.40 | 1.50 | 1.58 |
|---|---|---|---|---|---|
| | Viscosity, cp. | | | | |
| Time, hr.: | | | | | |
| 0 | 15 | 15 | 16 | 16.5 | 16 |
| 0.4 | 14 | 15 | 15 | 15.5 | 15 |
| 0.6 | 15 | 14.5 | 16 | 15.5 | 23.5 |
| 0.7 | 15.5 | 20 | 16 | 18 | 39 |
| 0.8 | 21.5 | 26.5 | 23 | 28 | 49 |
| 0.9 | 27.5 | 34 | 31 | 42 | 58.5 |
| 1.0 | 33 | 35 | 37 | 52.5 | 68 |
| 1.2 | 41 | 44.5 | 54.5 | 73 | 78.5 |
| 1.4 | 50 | 49.5 | 74.0 | 79 | 84.5 |
| 1.6 | 52 | 53 | 78 | 83 | 89 |
| 1.8 | 53 | 54 | 81.5 | 87 | 93.5 |
| 2.0 | 54 | 55 | 88 | 87 | 94 |
| ∞ | 57 | 58 | 88 | 87 | 98 |

All data are obtained using 50 ml. of a 1 M solution of acrylamide (AA) in ethylene glycol (1.24% water) at 60° C.

The induction times are the same for all lithium perchlorate (LP) concentrations, and there appears to be little difference in overall reaction times. At molar ratios greater than 1.0 there may be some slight increase in initial rate with increasing lithium perchlorate concentration, but this effect is hardly comparable to that exerted by the co-catalyst water concentration.

There is a significant difference in the degree of polymerization of solutions with lithium perchlorate/acrylamide mole ratios above and below 1.0. With molar ratios below 1.0, the final viscosity is between 65–75 cp. while at molar ratios above 1.0 the final viscosity lies between 85 and 100 cp. It would appear that the average molecular weight of the polymer formed at a mole ratio below 1.0 is significantly less.

*Example 7*

This example relates to the structure of the solid solution product prepared from the lithium perchlorate/acrylamide/ethylene glycol system.

Ethylene glycol apparently promotes the formation of crystallites by providing more fluidity in the solid solution. The crystallites in solid solutions of polyacrylamide/ethylene glycol containing small percentages of lithium perchlorate are different from those formed in a two-component system of polyacrylamide and lithium perchlorate. This species may arise from the formation of a ternary complex of polyacrylamide/ethylene glycol/lithium perchlorate. This possibility is supported by the fact that ethylene glycol and lithium perchlorate alone form still another unique crystalline compound, as shown by X-ray diffraction and solubility studies.

Results of X-ray diffraction work on solutions of 10, 30, 50 and 65 weight percent lithium perchlorate in a 2:1 weight ratio of polyacrylamide and ethylene glycol show that no significant amounts of lithium perchlorate or lithium perchlorate trihydrate are present in any sample. Each solution has a unique crystalline material amounting to about 25% by weight in each sample with about 50% by weight in the most concentrated solution. The remainder of the material is amorphous. The crystallites in these samples exceed 0.1 micron in size.

Solutions of lithium perchlorate in polyacrylamide contain an amorphous phase as well as a unique crystalline species whose concentration increases with increasing amounts of lithium perchlorate. This crystalline compound is not lithium perchlorate or its trihydrate, and it is not identifiable in the ASTM X-ray Powder Data file. This same crystalline material is found in solutions of lithium perchlorate in polyacrylamide/ethylene glycol, although the concentration is less than for a sample containing an equivalent amount of lithium perchlorate in pure polyacrylamide. These crystallites must be due to polymer/oxidizer interaction since the plasticizer/oxidizer interactions gave a different crystalline species, also unidentifiable in the ASTM Handbook.

A solution of lithium perchlorate in poly-N-acryloyl-morpholine/ethylene glycol also shows the same crystalline structure as the other samples with high lithium perchlorate concentrations. The dimensions of the unit cell are, however, slightly smaller.

From these data it is obvious that dissolved lithium perchlorate causes crystallinity, and correspondingly orientation of the polymer chains of an otherwise normally amorphous polymer. Because of the orientation of the chains, the polymer has increased strength. These data clearly explain the exceptional mechanical properties associated with solid solution structure.

*Example 8*

This example illustrates the electrical properties of the polyacrylamide solid solutions of lithium perchlorate, in the presence and absence of ethylene glycol.

The resistivity of solutions of 0, 10, 20, 30, and 40 weight percent lithium perchlorate in polyacrylamide is found to decrease with increasing lithium perchlorate content. The electrical resistivity of a solution of 20 wt. percent lithium perchlorate in poyacrylamide was from $10^2$ to $10^5$ times lower than the value for common polymers such as polyethylene. The dielectric constant is also 3 to 4 times greater than that of common polymers. Dielectric constant and dissipation factors at frequencies of 1000, 10,000, and 100,000 cps. were measured on the same five samples. Aside from the sample containing 40% lithium perchlorate, which showed high values of dissipation factor and dielectric constant, the samples did not show any correlation to the lithium perchlorate content, but were instead somewhat irregular.

| Sample | Range of dielectric constant | Range of dissipation factor, percent |
| --- | --- | --- |
| 0, 10, 20, 30 wt. percent $LiClO_4$ | 3.7–8.4 | 2.2–8.4 |
| 40 wt. percent $LiClO_4$ | 9.6–21.4 | 10.9–74.8 |
| Typical plastics | 2.3–4.5 | <0.05–1.3 |

The dielectric constant of solutions of 10, 20, and 30 weight percent lithium perchlorate in polyacrylamide measured at frequencies of 1, 10, and 100 kilocycles at five temperatures between −14° C. and +43° C. indicate that lithium perchlorate interacts with the amide groups of the polymer. The dielectric constant goes through a minimum value at about 10 weight percent (6.9 mole percent) lithium perchlorate. These data suggest that low concentrations of lithium perchlorate "crosslink" the polymer chains through the amide groups, restricting their rotation or motion under the influence of the applied field. Further addition of lithium perchlorate provides additional polar material to interact with the field, thus increasing the value of the dielectric constant.

The dielectric constant of the sample containing 10% ethylene glycol measured at frequencies of 1, 10 and 100 kilocycles, respectively, was approximately twice the value obtained for a sample containing the same ratio of lithium perchlorate and polyacrylamide but without ethylene glycol. It appears that the ethylene glycol reduces the viscosity of the samples thus permitting greater interaction between the polar groups and the applied electric field.

Measurement of the electrical conductivity of solid solutions of lithium perchlorate/ethylene glycol/polyacrylamide shows that the conductivity of these solutions increases with increasing ethylene glycol concentration:

| | 10 EG; 27 LP; 63 AA | 20 EG; 24 LP; 56 AA | 30 EG; 21 LP; 49 AA |
| --- | --- | --- | --- |
| Temperature, ° C.: | | | |
| 23 | $1.4 \times 10^{-10}$ | $8.6 \times 10^{-7}$ | $1.5 \times 10^{-6}$ |
| 34 | $2.2 \times 10^{-9}$ | $1.6 \times 10^{-7}$ | $1.9 \times 10^{-5}$ |
| 53 | $1.6 \times 10^{-8}$ | $2.6 \times 10^{-6}$ | $1.5 \times 10^{-5}$ |
| ΔE (Kcal./mole) | 29 | 22 | 14 |

EG=ethylene glycol; LP=lithium perchlorate; AA=polyacrylamide.

The value ΔE is the energy barrier height for conduction and was obtained by plotting the natural logarithm of the resistivity versus the reciprocal of the absolute temperature. From these data it is obvious that increasing concentration of ethylene glycol decreases the energy barrier thus causing greater conduction.

That the conductivity of solid solutions of lithium perchlorate in polyacrylamide increases with increasing lithium perchlorate content, and addition of ethylene glycol to these solid solutions increases the conductivity even more, as does an increase in temperature, may be explained by either ionic or semiconductor conductance.

If the conduction is ionic, the lithium perchlorate is the charge carrying species, and both increased temperature and ethylene glycol serve to increase mobility by reducing viscosity of the amorphous phase.

If, however, solid solutions behave as semiconductors, the addition of lithium perchlorate apparently creates additional energy levels close enough to the energy bands of the polymeric matrix to increase the electrical conductivity. Addition of ethylene glycol to the system further increases the conductivity, and this latter effect, when measured over a temperature range and expressed by the usual semiconductor equation, indicates that ethylene glycol lowers the energy barrier for conduction.

*Example 9*

The increase in close packing of the polymer chains and restriction of the motion of the polar amide groups in the polyacrylamide solid solutions of lithium perchlorate indicated by the dielectric constant measurements is also suggested by density measurements:

| Parts of lithium perchlorate for 3 parts polyacrylamide and 2 parts ethylene glycol | Density, g./cm.$^3$ | | Percent shrinkage |
|---|---|---|---|
| | Computed | Measured | |
| 0 | 1.116 | 1.170 | 4.84 |
| 0.5 | 1.173 | 1.272 | 8.43 |
| 1 | 1.225 | 1.320 | 7.75 |
| 2 | 1.317 | 1.419 | 7.74 |
| 3.75 | 1.448 | 1.521 | 5.04 |
| 5 | 1.524 | 1.569 | 2.95 |
| 7 | 1.622 | 1.653 | 1.91 |
| 9 | 1.701 | 1.711 | 0.59 |
| 10 | 1.735 | 1.736 | 0.058 |
| 11 | 1.765 | 1.766 | 0.057 |

*Example 10*

This example further illustrates preparation of solid solutions of lithium perchlorate in polyacrylamide including ethylene glycol.

A mixture is prepared of 15 parts of monomeric acrylamide and 10 parts of ethylene glycol, and 100 parts of lithium perchlorate are dissolved in this mixture at 85° C. The lithium perchlorate remains dissolved upon cooling at room temperature and the viscosity of this solution at room temperature is about that of ethylene glycol itself at room temperature. The solution will polymerize without the addition of any further constituent as catalyst. Polymerization at room temperature produces a rubbery solid in about 2 and ½ days while polymerization at 185° F. (85° C.) is complete in about 12 minutes. The final polymerized solid solution has a tensile strength of 130 p.s.i. and an elongation at break of 340% at room temperature.

Using 3 parts of acrylamide, 17.5 parts of lithium perchlorate and 2 parts of ethylene glycol, a polymeric solid solution of good mechanical properties is obtained in a reaction time of 1 hour at 60° C.

During the preparation of a sample from 9 parts of lithium perchlorate, 3 parts acrylamide and 2 parts ethylene glycol, it was discovered that incomplete polymerization of the acrylamide will permit the lithium perchlorate to precipitate from solution when the sample is chilled in a bath of acetone mixed with solid carbon dioxide. When the sample is warmed to 85° C., however, the lithium perchlorate redissolves and is held in solution when the sample is recooled to room temperature. In a solution of similar composition prepared and cured at 85° C. for 18 hours, all the lithium perchlorate remains in solution, even after cooling in the bath for 5 hours. These results show that high molecular weight polymers, which give solutions of extremely high viscosity, do not allow the lithium perchlorate to crystallize even when cooled at temperatures below which crystallization would normally occur.

*Example 11*

This example illustrates preparation of homogeneous polyacrylamide solutions of lithium perchlorate using other hydroxylic plasticizers.

A mixture of 20 parts of acrylamide and 5 parts of glycerol is heated to 85° C. and 62.5 parts of lithium perchlorate is added. This dissolves and produces polymerization of the acrylamide. The product is a homogeneous mixture of polymer and oxidant which is rubbery in nature. It has an ultimate strength at break of 383 p.s.i., elongation at break of 372%, and a modulus of 179 p.s.i. The product has good adhesion to steel.

Heating a mixture of 3 parts acrylamide, 17.5 parts lithium perchlorate and 2 parts of 1,4-butanediol for 8 hours at 60° C. also produces a solid solution product of good mechanical properties.

*Example 12*

This example illustrates practice of the method of this invention, using olefinic carbonamide monomers, with and without hydroxylic plasticizers, to produce novel products in the scope of this invention.

Lithium perchlorate is dissolved in reaction mixtures as shown in the following table. In each case, polymerization of the monomer is catalyzed by the perchlorate, and the product is a solid solution of the dissolved perchlorate in the polymer.

VINYLAMIDE/PLASTICIZER SYSTEMS WITH LITHIUM PERCHLORATE

| Monomer [1] | Plasticizer | Percent lithium [2] perchlorate dissolved at 185° F. (85° C.) | Auto catalysis |
|---|---|---|---|
| AA | 0 | 155 | Yes. |
| AA (8) | Glycerol (2) | 240 | Yes. |
| AA (7) | Glycerol (3) | 265 | Yes. |
| AA (6) | Glycerol (4) | 290 | Yes. |
| AA (6) NMA (2) | Glycerol (2) | 300 | Yes. |
| AA (2) NMA (6) | do | 350 | Yes. |
| AA (4) NMA (4) | do | 390 | Yes. |
| AA (5) | Ethylene glycol (5) | 400+ | Yes. |
| NMA (8) | Tris-hydroxymethyl-nitromethane (2). | 190 | Yes. |
| NMA (6) | Tris-hydroxymethyl-nitromethane (4). | 130 | Yes. |
| 0 | Glycerol | 270 | |

[1] AA means acrylamide; NMA means N-methylol acrylamide; parts by weight of plasticizer and olefin given in parentheses.
[2] Referred to weight of the monomer/plasticizer mixture. The solutions of lithium perchlorate in monomer/plasticizer all polymerize readily at 185° F. (85° C.)

The incorporation of a second coordinating oxygen atom in the substituted acrylamide monomer markedly increases its solvent power for lithium perchlorate. N-acryloyl morpholine

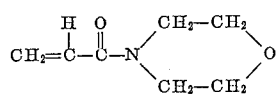

dissolves 135% by weight lithium perchlorate at 90° C., which corresponds almost exactly to a 2:1 molar ratio of lithium perchlorate to monomer. The addition compound is itself an opaque, white solid melting at 103–105° C., while the organic monomer is a liquid at room temperature. Polymerization of mixes including ethylene glycol is effected at temperatures above 90° C. Higher process temperatures do not appear to have a harmful effect on the system since a product has been maintained at 125° C. for several hours with no decomposition.

Either monomeric acrylamide ($CH_2$=$CHCONH_2$) or monomeric N-methylol acrylamide.

($CH_2$=$CHCONHCH_2OH$)

will dissolve lithium perchlorate, but when polyhydroxy alcohols such as ethylene glycol or glycerol are added, the solubility of lithium perchlorate is increased greatly. Ethylene glycol has the most marked effect; 20 parts of acrylamide plus 5 parts of glycerol will dissolve 45 parts of lithium perchlorate at 185° F. (85° C). The polyhydroxy compounds act as plasticizers for the polymer, as well as solvents for the perchlorate. Since the polymer is insoluble in normal solvents, the polyacrylamide seems to be crosslinked slightly. As a result of these two influences, the final solid solution is noticeably rubbery.

The synergistic action of the plasticizing glycols on solubility is evident. Thus, 10 parts glycerol dissolves 27 parts perchlorate, so 2 parts would dissolve 5.4 parts; and 10 parts acrylamide dissolves 15.5 parts, so 8 parts would dissolve 12 parts. The 8:2 mixture, however, dissolves 24 parts in 10 parts, instead of only the sum of 5.4 and 12, 17.4.

*Example 13*

This example illustrates the preparation of polymeric solid solutions of lithium perchlorate in polyacrylamide in the presence of nitrogeneous plasticizers.

A mixture is prepared of 3 parts of acrylamide, 1 part of acetamide and 1 part of ethylene glycol. To this is added 17.5 parts of lithium perchlorate. Heating for 8 hours at 60° C. gives a polymer with good mechanical properties.

Polymerization of 3 parts acrylamide with 1 part ethylene glycol, 1 part urea and 15 parts lithium perchlorate at 85° C. for 1 hour gives a hard rubbery product with a tensile strength of 120 p.s.i., elongation of 305%.

Three parts of acrylamide with 1 part of ethylene glycol, 1 part of oxamide and 15 parts of lithium perchlorate are mixed and heated in a dumbbell shaped mold. One hour's heating produces a rubbery mass which has a tensile strength of 105 p.s.i. and elongation of 775%. Increasing the cure to two hours increases the tensile 238 p.s.i. and decreases the elongation to 271%.

A mixture of 3 parts acrylamide with 2 parts d-tartaramide dissolves 480% of its own weight of lithium perchlorate and forms a slightly brittle polymer upon heating.

Heating a mixture of 3 parts acrylamide, 1 part d-tartaramide, 1 part ethylene glycol and 2 parts lithium perchlorate at 85° C. for one hour gives an excellent polymer which is rubbery and void-free.

100 parts of acrylamide, 33 parts of ethylene glycol and 33 parts of oxaldihydrazide dissolves 500–600 parts of lithium perchlorate, and the lithium perchlorate catalyzes polymerization of the acrylamide to crosslinked polyacrylamide.

A mixture of 15 parts of acrylamide, 10 parts of hydrazodicarbonamide and 50 parts of lithium perchlorate form a polymeric solid solution of lithium perchlorate at 85° C. in less than 15 minutes. The product is not quite so rubbery as the polymers prepared with ethylene glycol but elongation properties are still very favorable. Mixtures of ethylene glycol and hydrazodicarbonamide also act as plasticizers for the acrylamide polymer.

A mixture is prepared of 2 parts acrylamide, 1 part itaconyldiamide, 1 part ethylene glycol, 1 part oxamide and 15 parts lithium perchlorate. The mixture is cast into a dumbbell shaped mold and heated at 85° C. for 2 hours. The tensile strength is 96 p.s.i., and the elongation is 220%.

*Example 14*

This example illustrates polymerization of some non-amidic olefins to polymer in the presence of lithium perchlorate to form a solid solution.

25 parts of vinyloxyethanol are mixed with 6 parts of lithium perchlorate at 85° C. and held at this temperature for 6 hours. The product is a high viscosity gum.

Nine parts by weight of lithium perchlorate are dissolved in ten parts by weight of 4-vinylpyridine at 100° C. After 1 hour at between 110°–120° C. the mass is polymerized to a viscous stringy substance which can be drawn out into a fiber. Cooling to room temperature produces a solid solution of lithium perchlorate.

Acrylonitrile in a mixture of equal parts of acrylonitrile and ethylene glycol initiated by ammonium persulfate requires several days to polymerize completely and the polymer separates from the solution. The precipitation of the polymer from ethylene glycol solutions also occurs when acrylonitrile and lithium perchlorate are present in equimolar amounts. However, at a 1:1:3 weight ratio of the glycol, the nitrile and the perchlorate, the polymerization initiated by ammonium persulfate is complete in 16–24 hours at room temperature (25–28° C.), and the product is a firm, rubbery homogeneous material comprising each of the three components in the same homogeneous phase.

Lithium perchlorate is dissolved in a mixture of 4 parts by volume of acrylonitrile, and then 2 parts N-vinyl pyrrolidone and diazoisobutyronitrile (as a catalyst) are introduced while the reaction mixture is held at 45° C. The product is a polymer containing oxidant amounts of dissolved lithium perchlorate.

*Example 15*

This example illustrates preparation of polymeric solid solutions wherein the polymer is prepared from an olefinic amide.

3-acrylamino-1,2,4-triazole is prepared by condensing 3-amino-1,2,4-triazole with acrylyl anhydride. 15 parts of the resulting 2-acrylamino-1,2,4-triazole is mixed with 15 parts acrylamide, 2 parts ethylene glycol and 15 parts lithium perchlorate. Polymerization occurs in 20 minutes. The product is rubbery and hard. The polymer cured 1 hour has a tensile strength of 90 p.s.i. and elongation of 270%.

A good rubbery product is also obtained by homopolymerizing 2 parts of acrylamide with 1 part of 3-acetylamino-1,2,4-triazole and 2 parts ethylene glycol combined with 15 parts lithium perchlorate.

In 10 parts N-vinyl pyrrolidone is dissolved 18 parts lithium perchlorate at 140° C. The solution is cooled down to 80° C., 0.02 part of $\alpha,\alpha$-azodiisobutyronitrile is added and in 10 minutes the mass is polymerized to a hard white mass which contains the perchlorate in solution.

*Example 16*

This example illustrates preparation of a solid solution of silver perchlorate in acrylonitrile.

To 5.0 parts (about 0.1 mole) of acrylonitrile is added 20 parts about 0.1 mole) of anhydrous silver perchlorate, in 5 part increments. The first 15 parts are added over a period of about one hour, while the vinyl monomer is stirred at room temperature. Then the final 5 parts are added and the mixture is heated to 60° C. to facilitate solution. Polymerization starts before solution is complete, and heating is discontinued. After two hours at room temperature, all the monomer is polymerized to a firm, rubbery, clear polymeric solid solution of the metal salt, with some of the last-added portion of the silver perchlorate undissolved and occluded in the polymer at the bottom of the container. The solid polymeric product is removed from the container and the section containing undissolved metal salt is cut away. When the polymeric product has stood exposed to the atmosphere for 5 days, it has changed from a clear transparent material to a deep maroon color, but is otherwise unchanged, and remains a tough rubber material which is homogeneous in nature.

A portion of the dark red product, circular in cross-section and having a radius of 0.5 centimeter and thickness of 0.4 cm., is coated on its two flat surfaces with silver to provide electrical contact, and the resistance is measured at 24° C. The resistivity is 4780 ohm-centimeter, which is in the region of semi-conductors. With better electrical contacts, lower values are obtained.

*Example 17*

This example illustrates a preparation of a polyacrylamide solid solution of a lead salt employing an organic plasticizer in the mix.

3 parts of acrylamide are combined with 1 part of formamide, and this is gently warmed and stirred while sixteen parts of lead acetate trihydrate are introduced. A catalytic amount of ammonium persulfate is added, and the solution is gently warmed to about 55° C. The monomer polymerizes to a clear, colorless, soft rubbery polymer which is optically clear.

When the acrylamide-formamide mixture with the lead acetate trihydrate is mixed with a larger amount of persulfate, the polymerization is vigorous, with a substantial exotherm and evolution of a gas which appears to be water vapor from the water of hydration of the lead acetate. The mass then polymerized to a hard clear foam.

*Example 18*

A mixture of equal parts by weight of lithium nitrate and acrylamide is heated to 70° C. After about 4 hours, half of the sample has polymerized (separating away from solution) into a clear hard polymeric product. Similar results are obtained with equal parts by weight of lithium nitrate and acrylamide at 57.5° C., after six hours.

Three parts of acrylamide, 2 parts of ethylene glycol, and 5 parts of lithium nitrate are combined and held at 82° C. After an induction period of about 1 and ½ hours, polymerization begins, an exotherm is observed, and the entire mass is polymerized to a rubbery product.

*Example 19*

Gentle heating of 300 parts of anhydrous zinc chloride with 100 parts of propionamide converts the mixture of solids to a clear, water-white liquid. On cooling to room temperature, the mix remains transparent and fluid, but viscous. The combination of 100 parts of the anhydrous zinc chloride and 100 parts of acrylamide correspondingly forms a clear solution on heating to 85° C., which rapidly thickens during formation of the solution and quickly solidifies into a solid polymeric solution of the salt. The solid, hard product is optically clear and water-white.

While the invention has been described with particular reference to specific individual embodiments thereof, it is to be appreciated that it is not limited thereto, and modifications and variations can be made without departing from the scope of the invention, which is limited only as defined in the following claims.

What is claimed is:

1. A polymeric solid solution of a metal salt, comprising the polymer of a vinyl monomer including a donor atom selected from the group consisting of N, O and S, and at least about one-twelfth mole of substantially anhydrous metal salt per mole of polymerized vinyl monomer units, in the same homogeneous phase.

2. The method of providing a polymeric solid solution of a metal salt which comprises polymerizing a vinyl monomer including a donor atom selected from the group consisting of N, O and S in the presence of at least about one-twelfth mole of dissolved metal salt for mole of said monomer.

3. The method of claim 2 in which said vinyl monomer is an acrylamide.

4. The method of claim 2 in which said metal salt is an anhydrous perchlorate salt.

5. The method of claim 2 in which said polymerization mixture includes a plasticizer solvent.

6. The method of claim 5 in which said plasticizer solvent is selected from the class consisting of hydroxylic and amidic plasticizers.

7. The method which comprises polymerizing acrylamide in the presence of at least about 0.1 part of dissolved substantially anhydrous lithium perchlorate per part by weight of acrylamide.

8. The method of claim 7 wherein the mixture of acrylamide and lithium perchlorate contains ethylene glycol.

9. A solid solution of substantially anhydrous lithium perchlorate in the same homogeneous phase as solid polyacrylamide, in an amount equal to at least 0.1 part of said perchlorate per part of polymerized acrylamide units.

10. The product of claim 1 in which said metal salt is a lithium salt.

11. The product of claim 10 in which said metal salt is lithium perchlorate.

12. The product of claim 1 in which said metal salt is a lead salt.

13. The product of claim 12 in which said metal salt is lead acetate.

14. The product of claim 1 in which said metal salt is a zinc salt.

15. The product of claim 14 in which said metal salt is zinc chloride.

16. The product of claim 1 in which said vinyl monomer is an acrylamide.

17. The product of claim 1 in which said vinyl monomer is acrylamide.

References Cited by the Examiner

UNITED STATES PATENTS

| | | | |
|---|---|---|---|
| 2,984,634 | 5/1961 | Caldwell et al. | 260—41 |
| 2,992,908 | 7/1961 | Hedrick et al. | 149—83 X |
| 3,000,713 | 9/1961 | Gold | 149—19 |
| 3,002,830 | 10/1961 | Barr | 149—83 X |
| 3,003,310 | 10/1961 | D'Alelio | 149—83 X |
| 3,017,260 | 1/1962 | Arquette et al. | 149—83 X |
| 3,054,702 | 9/1962 | Stengel et al. | 149—19 |
| 3,055,781 | 9/1962 | Yamamoto | 149—83 X |
| 3,094,444 | 6/1963 | Hedrick et al. | 149—19 |
| 3,107,185 | 10/1963 | Hedrick et al. | 149—19 X |

CARL D. QUARFORTH, *Primary Examiner.*

OSCAR R. VERTIZ, *Examiner.*